United States Patent
Nicklasson et al.

(10) Patent No.: US 12,508,870 B2
(45) Date of Patent: Dec. 30, 2025

(54) METHOD FOR CONTROLLING AN AIR CONDITION ARRANGEMENT OF A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Kristian Nicklasson, Åsa (SE); Emil Frykberg, Gothenburg (SE); Mikael Larsson, Hisings-Kärra (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 98 days.

(21) Appl. No.: 18/630,678

(22) Filed: Apr. 9, 2024

(65) Prior Publication Data
US 2024/0270047 A1    Aug. 15, 2024

Related U.S. Application Data

(63) Continuation of application No. PCT/CN2022/124404, filed on Oct. 10, 2022.

(30) Foreign Application Priority Data
Oct. 28, 2021    (EP) .................................. 21205308

(51) Int. Cl.
*B60H 1/00*    (2006.01)
*B60H 1/32*    (2006.01)

(52) U.S. Cl.
CPC ....... *B60H 1/00821* (2013.01); *B60H 1/3205* (2013.01)

(58) Field of Classification Search
CPC .............. B60H 1/00821; B60H 1/3205; B60H 1/3213; B60H 1/00921; B60H 1/00899;
(Continued)

(56) References Cited

U.S. PATENT DOCUMENTS

| | | |
|---|---|---|
| 6,311,505 B1 | 11/2001 | Takano et al. |
| 9,499,025 B2 | 11/2016 | Liu |
| 2005/0028547 A1 | 2/2005 | Hatakeyama |

FOREIGN PATENT DOCUMENTS

| | | | | |
|---|---|---|---|---|
| DE | 102020007164 A1 | 1/2021 | | |
| ES | 2256596 T3 | * | 7/2006 | ......... B60H 1/00521 |

(Continued)

OTHER PUBLICATIONS

International Search Report from corresponding International Application No. PCT/CN2022/124404, mailed Jan. 16, 2023, 2 pages.

*Primary Examiner* — Emmanuel E Duke
(74) *Attorney, Agent, or Firm* — Tucker Ellis LLP

(57) ABSTRACT

A method for controlling an air condition arrangement of a vehicle. The air condition arrangement includes a heat pump system having a compressor, a condenser, and an evaporator. An air distribution unit is arranged in the vehicle for providing air to a vehicle compartment of the vehicle. The method includes directing a flow of air heated by the condenser by work from the compressor to the evaporator.

7 Claims, 2 Drawing Sheets

(58) Field of Classification Search
CPC .. B60H 2001/00961; B60H 2001/3241; B60H 2001/3258; B60H 2001/3282
See application file for complete search history.

(56) References Cited

FOREIGN PATENT DOCUMENTS

| | | | | |
|---|---|---|---|---|
| FR | 2743027 A1 | * | 7/1997 | ......... B60H 1/00007 |
| WO | 2013105202 A1 | | 7/2013 | |
| WO | 2018190081 A1 | | 10/2018 | |

* cited by examiner

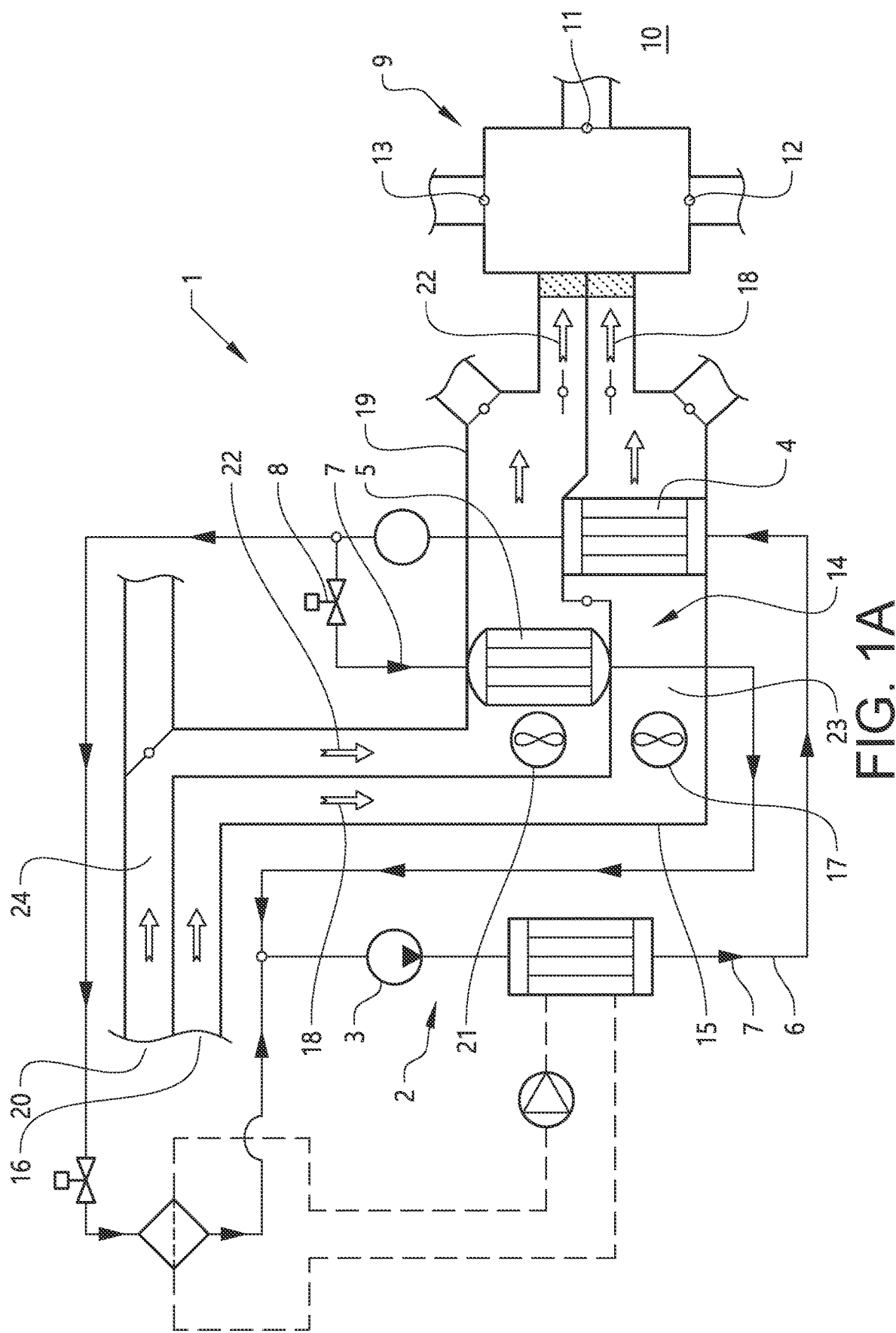

METHOD FOR CONTROLLING AN AIR CONDITION ARRANGEMENT OF A VEHICLE

RELATED APPLICATION DATA

This application is a continuation of International Patent Application No. PCT/CN2022/124404, filed Oct. 10, 2022, which claims the benefit of European Patent Application No. 21205308.6, filed Oct. 28, 2021, the disclosures of which are incorporated herein by reference in their entireties.

TECHNICAL FIELD

The invention relates to a method and a control unit for controlling an air condition arrangement of a vehicle.

BACKGROUND

An air condition arrangement of a vehicle usually comprises a heat pump system with a refrigerant loop and a HVAC module arranged in the engine compartment of the vehicle. In addition, an air distribution unit connected to the HVAC module can be arranged in the vehicle compartment for controlling the airflow into the vehicle compartment.

Such an air condition arrangement sometimes does not work in an optimal way since the heat pump system has low performance at start up in cold weather.

SUMMARY

An objective of the invention is to provide a method for controlling an air condition arrangement of a vehicle, by which method an improved performance of the air condition arrangement when used in cold weather can be achieved.

The objective is achieved by a method for controlling an air condition arrangement of a vehicle, wherein the air condition arrangement comprises a heat pump system having a compressor, a condenser and an evaporator, and the method comprises the step of directing a flow of air heated by the condenser by work from the compressor to the evaporator.

The invention is based on the insight that such a method resulting in that the heat pump system is at least partly "short-circuited" with respect to the energy flow of the heat pump system, can be used for increasing the performance of the air condition arrangement.

According to one embodiment, the method comprises transferring energy to a low-pressure side of the heat pump system via the evaporator by directing the air flow to the evaporator. Hereby, the pressure at the low pressure side of the heat pump system can be increased and the time required before the heat pump is able to work at nominal power in cold weather can be shorted.

According to a further embodiment, the method comprises increasing the temperature of the evaporator by directing the air flow to the evaporator. Hereby, the evaporator can be defrosted after have been running at sub-zero degrees centigrade for a period of time.

According to a further embodiment of the method, the air condition arrangement comprises an air distribution unit arranged in the vehicle for providing air to a vehicle compartment of the vehicle, and a condenser fan duct providing air from outside the vehicle to the air distribution unit, which air passes the condenser arranged in the condenser fan duct before reaching the air distribution unit, and an evaporator fan duct providing air from outside the vehicle to the air distribution unit, which air passes the evaporator arranged in the evaporator fan duct before reaching the air distribution unit, and the method comprises the step of redirecting an air flow from the condenser fan duct incoming to the air distribution unit, to the evaporator fan duct such that the air from the condenser fan duct will flow in the evaporator fan duct in a reversed direction from the air distribution unit to the outside of the vehicle. Hereby, the air heated by the condenser can be directed to the evaporator in a rational way without or with a minimum of additional equipment added to the air condition arrangement.

According to a further embodiment, the method comprises regenerating a filter arranged in the evaporator fan duct by directing the air flow to the filter. The air is preferably heated to a temperature over 60° C. by the condenser. Hereby, humidity can be removed from a filter, such as an active carbon filter, and the filter can regain filtering capacity.

The invention also relates to a control unit controlling an air condition arrangement of a vehicle. The advantages of the control unit are similar to the advantages already discussed hereinabove with reference to different embodiments of the method.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings:

FIG. 1A is a schematic illustration of an air condition arrangement for a vehicle.

DETAILED DESCRIPTION OF EXAMPLE EMBODIMENTS

Figure 1B:
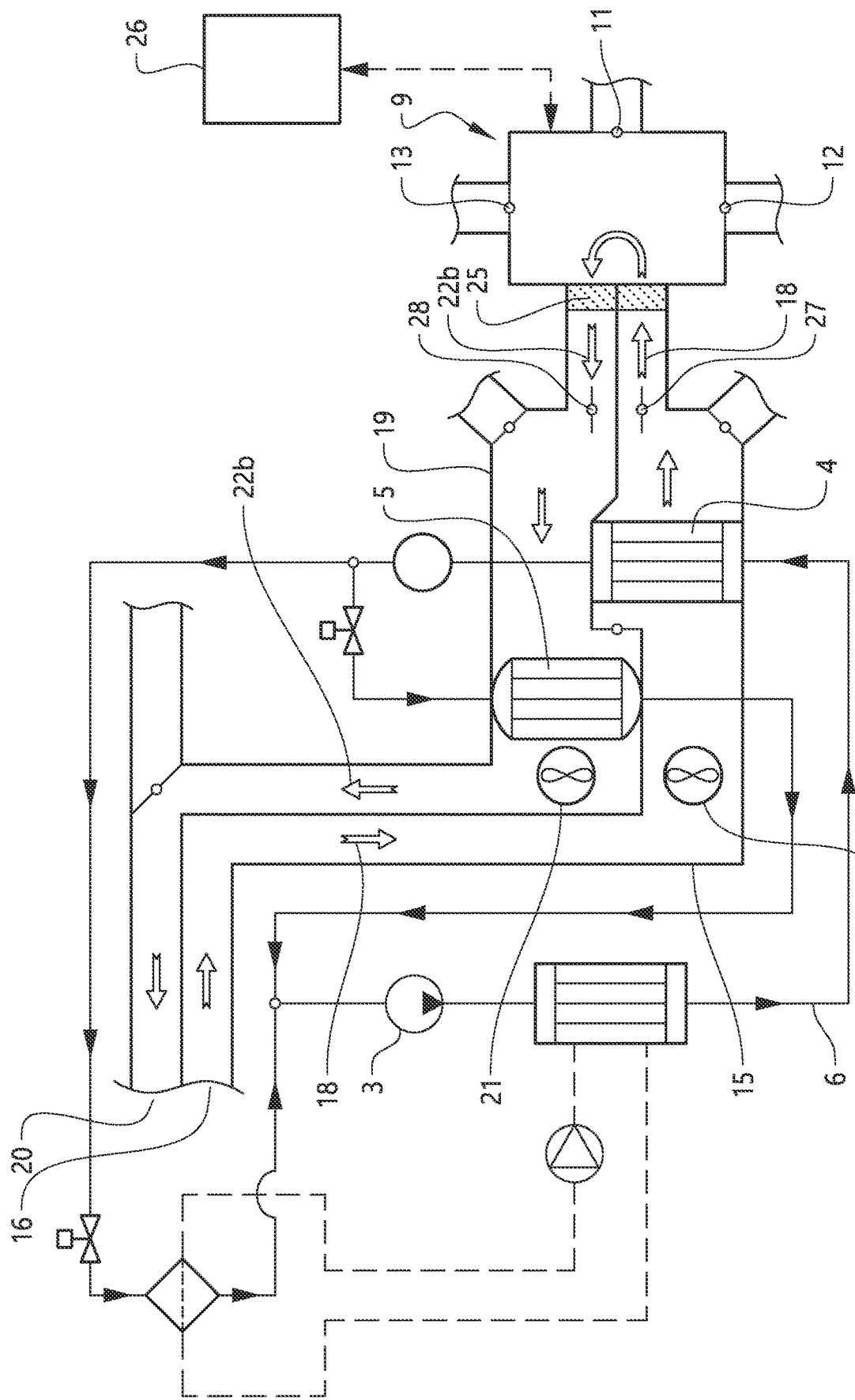
FIG. 1B shows how the air condition arrangement in FIG. 1A can be used.

FIG. 1A is a schematical illustration of an air condition arrangement 1 for a vehicle.

The air condition arrangement 1 comprises a heat pump system 2 having a compressor 3, a condenser 4 and an evaporator 5. The heat pump system 2 has a loop or circuit 6 containing a refrigerant or working fluid. The refrigerant can flow in the circuit 6 in a direction from the compressor 3 to the condenser 4 and further from the condenser 4 to the evaporator 5 and from the evaporator 5 back to the compressor 3. The circulating direction of the refrigerant (to which the expressions upstream and downstream refer) in the circuit 6 is indicated by arrows 7. The compressor 3 is arranged for compressing the refrigerant circulating in the circuit 6 of the heat pump system 2. The compressor 3 can be driven by an electric motor (not shown). The heat pump system 2 further comprises an expansion valve 8 arranged upstream the evaporator 5 in the circuit 6 at a position between the condenser 4 and the evaporator 5. The expansion valve 8 is arranged to regulate a pressure drop of the refrigerant before the evaporator 5.

The operating principle of the heat pump system 2 can be as follows. The refrigerant being in gaseous state is pressurized and circulated through the system by the compressor 3. The flow of refrigerant in the circuit 6 is controlled by the operation of the compressor 3. After passing the compressor 3, the hot and highly pressurized refrigerant is cooled in the condenser 4 until the refrigerant condenses into a high-pressure liquid having a lower temperature. The condensed refrigerant passes through the expansion valve 8 and then enters the evaporator 5, where the refrigerant absorbs heat and is evaporated. Thereafter, the flow of refrigerant returns to the compressor 3 and the cycle is repeated. The heat pump system 2 can be arranged in the engine compartment of the vehicle.

The air condition arrangement 1 further comprises an air distribution unit 9 arranged in the vehicle for providing air to a vehicle compartment 10 of the vehicle. The air distribution unit 9 may have ports 11, 12, 13, which can be opened and closed, communicating with the vehicle compartment 10, such that air can be used for ventilation, the floor, defroster, etc., of the vehicle. The air distribution unit 9 is suitably arranged in immediate vicinity to or in the vehicle compartment 10.

The air condition arrangement 1 suitably also comprises a HVAC module 14 interacting with the heat pump system 2 which module is connected to the air distribution unit 9 for providing heated or chilled air to the air distribution unit 9. The HVAC module 14 is suitably arranged in the engine compartment of the vehicle.

In the example embodiment illustrated in FIG. 1A, the HVAC module 14 comprises a condenser fan duct 15 arranged to provide air from outside 16 the vehicle to the air distribution unit 9. The condenser fan duct 15 extends from outside 16 the vehicle to the air distribution unit 9. The air can be transported by a condenser fan 17 and passes the condenser 4 arranged in the condenser fan duct 15 before reaching the air distribution unit 9. In other words; the condenser 4 is arranged downstream the compressor 3 in the heat pump system 2 for exchanging heat with the air flowing in the condenser fan duct 15. In this way heated air can be provided to the air distribution unit 9 and further to the vehicle compartment 10. The direction of the airflow in the condenser fan duct 15 is indicated by arrows 18.

Further, the HVAC module comprises an evaporator fan duct 19 arranged to provide air from outside 20 the vehicle to the air distribution unit 9. The evaporator fan duct 19 extends from outside 20 the vehicle to the air distribution unit 9. The air can be transported by an evaporator fan 21 and passes the evaporator 5 arranged in the evaporator fan duct 19 before reaching the air distribution unit 9. In other words; the evaporator 5 is arranged upstream the compressor 3 in the heat pump system 2 for exchanging heat with the air flowing in the evaporator fan duct 19. In this way chilled air can be provided to the air distribution unit 9 and further to the vehicle compartment 10. The direction of the airflow in the evaporator fan duct 19 is indicated by arrows 22.

The condenser fan duct 15 and the evaporator fan duct 19 are suitably separate ducts which apart from being connected to the air distribution unit 9 have channels 23, 24 for providing air, which channels 23, 24 are separated from each other.

With reference to FIG. 1B, an example embodiment of the method is described. A flow of air heated by the condenser 4 by work from the compressor 3 is directed to the evaporator 5. The air flow directed to the evaporator 5 can be a part of the flow, suitably a major part of the flow and preferably substantially the entire air flow passing the condenser. This is indicated with arrows 18, 22b showing the airflow from outside 16 the vehicle in the condenser fan duct 15 to the condenser 4 and further to the air distribution unit 9 and thereafter in the evaporator fan duct 19 from the air distribution unit 9 to the evaporator 5 and further to outside 20 of the vehicle.

The method is applied temporarily, such as during a certain time period at start up in cold weather. As soon as sufficient energy has been transferred via the evaporator 5 to the low-pressure side of the heat pump system 2 enabling the heat pump system to work at nominal power or the temperature of the evaporator 5 has been increased sufficiently for defrosting the evaporator 5, the reversed flow (as compared to normal operation) in the evaporator fan duct 19 is stopped and both the condenser fan duct 15 and the evaporator fan duct 19 can be used again for providing air from outside 16, 20 the vehicle to the air distribution unit 9, as illustrated in FIG. 1A.

The reversed flow of heated air can also be used for increasing the temperature of a filter 25 for the purpose of regenerating the filter 25. Such a filter 25 can be arranged in the evaporator fan duct 19, for example close to the air distribution unit 9.

FIG. 1B also shows a control unit 26 controlling the air condition arrangement 9. The control unit 26 is configured to control the air distribution unit 9 to redirect an air flow from the condenser fan duct 15 incoming to the air distribution unit 9, to the evaporator fan duct 19 such that the air from the condenser fan duct 15 will flow in the evaporator fan duct 19 in the reversed direction 22b from the air distribution unit 9 to the outside 20 of the vehicle. This can be performed by closing all ports 11, 12, 13 of the air distribution unit 9 normally used for providing air into the vehicle compartment 10, while a port 27 between the condenser fan duct 15 and the air distribution unit 9, which port 27 can be opened and closed for communication with the air distribution unit 9, is open at the same time as a port 28 between the evaporator fan duct 19 and the air distribution unit 9, which port 28 can be opened and closed for communication with the air distribution unit 9, is open as well. In this way, the heat pump system 2 is "short circuited" with respect to the energy flow, since energy of the air heated by the condenser 4 can be transferred to the evaporator 5 and further to the refrigerant of the circuit 6.

Further, in this reverse mode where air flows in the reversed direction 22b in the evaporator fan duct 19, the condenser fan 17 is driven whereas the evaporator fan 21 is not running.

In this connection, it is stressed that the interconnection of the condenser fan duct 15 and the evaporator fan duct 19 can be achieved by equivalent solutions where the ducts are temporarily connected to each other at a position outside the air distribution unit 9, as long as the connection point is situated between the condenser 4 and the air distribution unit 9 with respect to the condenser fan duct 15, and between the evaporator 5 and the air distribution unit 9 with respect to the evaporator fan duct 19, though the use of the air distribution unit 9 for connection of the ducts enables a less complicated design.

The control unit 26 may comprise one or more microprocessors and/or one or more memory devices or any other components for executing computer programs or receiving and/or sending control signals for providing the control function. Particularly, the control unit 26 is preferably provided with a computer program comprising program code means for performing all steps of any embodiment of the method described herein. The control unit 26 can be a separate component or be integrated in another controller. The control unit can be arranged to control other components of the air condition arrangement.

It is to be understood that the present invention is not limited to the embodiments described above and illustrated in the drawings; rather, the skilled person will recognize that many changes and modifications may be made within the scope of the appended claims.

What is claimed is:

1. A method for controlling an air condition arrangement of a vehicle, the air condition arrangement comprising a heat pump system having a compressor, a condenser and an evaporator, the method comprising directing a flow of air heated by the condenser by work from the compressor to the evaporator, wherein the air condition arrangement comprises an air distribution unit arranged in the vehicle for providing air to a vehicle compartment of the vehicle, and a condenser fan duct providing air from outside the vehicle to the air distribution unit, which air passes the condenser arranged in the condenser fan duct before reaching the air distribution unit, and an evaporator fan duct providing air from outside the vehicle to the air distribution unit, which air passes the evaporator arranged in the evaporator fan duct before reaching the air distribution unit, wherein redirecting an air flow from the condenser fan duct incoming to the air distribution unit, to the evaporator fan duct such that the air from the condenser fan duct will flow in the evaporator fan duct in a reversed direction from the air distribution unit to the outside of the vehicle.

2. The method according to claim 1, wherein transferring energy to a low-pressure side of the heat pump system via the evaporator by directing the air flow to the evaporator.

3. The method according to claim 1, wherein increasing the temperature of the evaporator by directing the air flow to the evaporator.

4. The method according to claim 1, wherein regenerating a filter arranged in the evaporator fan duct by directing the air flow to the filter.

5. The method according to claim 4, wherein heating the air to a temperature over 60° C. by the condenser.

6. A non-transitory computer readable medium storing a computer program comprising program code that, when the program is executed by a computer, causes the computer to carry out the method according to claim 1.

7. A control unit controlling an air condition arrangement of a vehicle, the air condition arrangement comprising a heat pump system having a compressor, a condenser and an evaporator, the air condition arrangement further comprising an air distribution unit arranged in the vehicle for providing air to a vehicle compartment of the vehicle, and a condenser fan duct providing air from outside the vehicle to the air distribution unit, which air passes the condenser arranged in the condenser fan duct before reaching the air distribution unit, and an evaporator fan duct providing air from outside the vehicle to the air distribution unit, which air passes the evaporator arranged in the evaporator fan duct before reaching the air distribution unit, wherein the control unit is configured to control the air distribution unit to redirect an air flow from the condenser fan duct incoming to the air distribution unit, to the evaporator fan duct such that the air from the condenser fan duct will flow in the evaporator fan duct in a reversed direction from the air distribution unit to the outside of the vehicle.

\* \* \* \* \*